(12) United States Patent
Kim (10) Patent No.: US 11,299,003 B2
(45) Date of Patent: Apr. 12, 2022

(54) TUNING FREEDOM DEGREE IMPROVEMENT TYPE BUSH AND SUSPENSION SYSTEM

(71) Applicants: HYUNDAI MOTOR COMPANY, Seoul (KR); KIA MOTORS CORPORATION, Seoul (KR)

(72) Inventor: Jae-Hun Kim, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 66 days.

(21) Appl. No.: 16/692,465

(22) Filed: Nov. 22, 2019

(65) Prior Publication Data

US 2021/0016623 A1 Jan. 21, 2021

(30) Foreign Application Priority Data

Jul. 19, 2019 (KR) .................. 10-2019-0087821

(51) Int. Cl.
*B60G 21/05* (2006.01)
*B60G 7/00* (2006.01)

(52) U.S. Cl.
CPC .......... *B60G 21/051* (2013.01); *B60G 7/001* (2013.01); *B60G 2200/21* (2013.01); *B60G 2200/462* (2013.01); *B60G 2204/1434* (2013.01); *B60G 2204/41* (2013.01); *B60G 2206/20* (2013.01)

(58) Field of Classification Search
CPC .................. B60G 21/051; B60G 7/001; B60G 2204/1434; B60G 2204/41; B60G 2200/21; B60G 2206/20; B60G 2200/462; F16C 27/063; F16C 33/125; F16F 1/38; F16F 1/3835; F16F 1/3863; F16F 1/376
See application file for complete search history.

(56) References Cited

U.S. PATENT DOCUMENTS

| | | | | |
|---|---|---|---|---|
| 1,939,444 A | * | 12/1933 | Geyer | B60G 11/12 267/270 |
| 3,468,175 A | * | 9/1969 | Rabek | F16H 25/06 74/63 |
| 4,202,564 A | * | 5/1980 | Strader | B60G 5/04 280/124.158 |
| 4,619,544 A | * | 10/1986 | Laidely | B60G 7/00 403/162 |
| 4,707,149 A | * | 11/1987 | Hahle | B60G 21/0551 384/294 |
| RE32,774 E | * | 11/1988 | Duff | B60G 9/003 280/124.177 |

(Continued)

FOREIGN PATENT DOCUMENTS

| | | |
|---|---|---|
| CN | 202209373 U | 5/2012 |
| CN | 205154994 U | 4/2016 |

(Continued)

*Primary Examiner* — Paul N Dickson
*Assistant Examiner* — Timothy Wilhelm
(74) *Attorney, Agent, or Firm* — Lempia Summerfield Katz LLC (57) ABSTRACT

A bush may include: a second inner pipe forming a central protrusion in a central section of the second inner pipe; and an outer pipe forming a third protrusion at a first inner side and a fourth protrusion at a second inner side. In particular, the third and fourth protrusions are arranged outside of the central protrusion.

15 Claims, 10 Drawing Sheets

(56) References Cited

U.S. PATENT DOCUMENTS

| | | | | |
|---|---|---|---|---|
| 4,817,926 A * | 4/1989 | Schwerdt | F16F 13/1463 | 267/140.12 |
| 5,042,785 A * | 8/1991 | LeFol | F16F 13/14 | 267/140.12 |
| 5,052,665 A * | 10/1991 | Sakuragi | B60G 15/068 | 267/220 |
| 5,100,114 A * | 3/1992 | Reuter | F16C 27/063 | 267/141.2 |
| 5,139,244 A * | 8/1992 | Chakko | F16F 1/38 | 267/293 |
| 5,170,997 A * | 12/1992 | Girard | F16F 13/14 | 180/312 |
| 5,190,269 A * | 3/1993 | Ikeda | F16F 1/387 | 267/140.12 |
| 5,280,885 A * | 1/1994 | Noguchi | F16F 13/14 | 180/312 |
| 5,326,128 A * | 7/1994 | Cromley, Jr. | B60G 3/145 | 180/906 |
| 5,496,018 A * | 3/1996 | McLelland | F16F 13/14 | 267/140.12 |
| 5,520,465 A * | 5/1996 | Kammel | B60G 21/0551 | 267/293 |
| 5,540,420 A * | 7/1996 | Luzsicza | F16C 27/063 | 267/141.1 |
| 5,655,758 A * | 8/1997 | Hadano | B60G 21/052 | 267/141.4 |
| 5,820,115 A * | 10/1998 | Stevenson | F16F 1/38 | 267/293 |
| 5,887,859 A * | 3/1999 | Hadano | F16F 1/38 | 267/141.1 |
| 6,053,489 A * | 4/2000 | Enke | F16C 27/063 | 267/141.3 |
| 6,082,721 A * | 7/2000 | Kingsley | F16B 11/008 | 267/276 |
| 6,224,046 B1 * | 5/2001 | Miyamoto | B60G 3/202 | 267/140.12 |
| 6,237,903 B1 * | 5/2001 | Novak | B60G 7/02 | 267/141.3 |
| 6,293,531 B1 * | 9/2001 | Kato | F16F 1/371 | 267/140.12 |
| 6,692,179 B2 * | 2/2004 | Bohne | F16C 11/0614 | 403/141 |
| 6,817,599 B2 * | 11/2004 | Kato | F16F 1/387 | 267/140 |
| 7,198,256 B2 * | 4/2007 | Tatura | F16F 1/387 | 267/140.12 |
| 7,438,493 B2 * | 10/2008 | Holmes | F16C 11/0614 | 403/134 |
| 7,581,721 B2 * | 9/2009 | Kobayashi | F16F 1/3863 | 267/140.12 |
| 7,926,609 B2 * | 4/2011 | Kusaka | B62D 21/155 | 180/232 |
| 8,424,891 B2 * | 4/2013 | Nagai | F16F 1/16 | 280/124.107 |
| 8,434,749 B2 * | 5/2013 | Rogge | F16F 1/3863 | 267/293 |
| 8,444,158 B2 * | 5/2013 | Darcy-Sharma | B60G 7/006 | 280/93.511 |
| 8,459,676 B2 * | 6/2013 | Heimann | F16F 1/3683 | 280/124.175 |
| 8,505,889 B2 * | 8/2013 | Suzuki | B60G 3/20 | 267/293 |
| 8,783,993 B2 * | 7/2014 | Brunneke | F16F 1/3842 | 403/133 |
| 8,888,082 B2 * | 11/2014 | Kang | B60G 21/0551 | 267/294 |
| 9,217,488 B2 * | 12/2015 | Cha | F16F 13/1463 | |
| 9,475,358 B2 * | 10/2016 | Grim | F16F 1/393 | |
| 9,517,671 B2 * | 12/2016 | Palka | B60G 11/38 | |
| 9,556,903 B2 * | 1/2017 | Conrad | F16C 27/063 | |
| 9,719,570 B2 * | 8/2017 | Kojima | F16F 1/3876 | |
| 9,732,816 B2 * | 8/2017 | Conrad | F16C 27/063 | |
| 9,931,902 B2 * | 4/2018 | Tsukamoto | B60G 21/0551 | |
| 9,964,173 B2 * | 5/2018 | Kadowaki | F16F 13/1418 | |
| 9,976,620 B2 * | 5/2018 | Rawlings | F16F 1/3835 | |
| 9,981,524 B2 * | 5/2018 | Matsumura | B60G 21/0551 | |
| 10,107,354 B2 * | 10/2018 | Kojima | F16F 13/16 | |
| 10,309,477 B2 * | 6/2019 | Komiya | F16F 1/3814 | |
| 10,508,701 B2 * | 12/2019 | Cerri, III | B60G 7/001 | |
| 10,603,970 B2 * | 3/2020 | Auten | F16F 1/38 | |
| 10,753,417 B2 * | 8/2020 | Akiyama | B60G 21/0551 | |
| 10,807,430 B2 * | 10/2020 | Babu | B60B 35/04 | |
| 10,821,793 B2 * | 11/2020 | Nishimura | B60G 7/02 | |
| 10,865,845 B2 * | 12/2020 | Niwa | F16F 15/08 | |
| 2002/0060385 A1 * | 5/2002 | Mayerbock | F16F 13/14 | 267/293 |
| 2003/0020223 A1 * | 1/2003 | Kameda | B21K 21/12 | 267/293 |
| 2005/0153781 A1 * | 7/2005 | Buhl | F16F 1/3842 | 464/89 |
| 2006/0273540 A1 * | 12/2006 | Heron | B60G 11/24 | 280/124.116 |
| 2009/0200767 A1 * | 8/2009 | Lim | F16F 1/38 | 280/124.152 |
| 2010/0065998 A1 * | 3/2010 | Tomida | B60G 7/02 | 267/293 |
| 2011/0175269 A1 * | 7/2011 | Harada | F16F 1/3835 | 267/293 |
| 2012/0175831 A1 * | 7/2012 | Kieffer | F16F 1/3828 | 267/292 |
| 2013/0025087 A1 * | 1/2013 | Jang | F16C 11/0685 | 16/2.2 |
| 2014/0091507 A1 * | 4/2014 | Oldfield | B60G 11/22 | 267/292 |
| 2014/0183803 A1 * | 7/2014 | Ha | F16F 1/387 | 267/292 |
| 2016/0152106 A1 * | 6/2016 | Preijert | B60G 11/04 | 280/124.116 |
| 2017/0282447 A1 * | 10/2017 | Suzuki | B29C 66/742 | |
| 2020/0132151 A1 * | 4/2020 | Nakagaki | B60G 7/005 | |
| 2020/0393017 A1 * | 12/2020 | Axman | F16F 15/08 | |

FOREIGN PATENT DOCUMENTS

| | | |
|---|---|---|
| JP | H07-098034 A | 4/1995 |
| JP | H10-038002 A | 2/1998 |
| JP | 2918604 B2 | 7/1999 |
| JP | 2004-144150 A | 5/2004 |
| KR | 10-2011-0123897 A | 11/2011 |
| KR | 10-2013-0052959 A | 5/2013 |

* cited by examiner

TUNING FREEDOM DEGREE IMPROVEMENT TYPE BUSH AND SUSPENSION SYSTEM

CROSS-REFERENCE TO RELATED APPLICATION

This application claims priority to and the benefit of Korean Patent Application No. 10-2019-0087821, filed on Jul. 19, 2019, the entire contents of which are incorporated herein by reference.

FIELD

The present disclosure relates to a bush, and more particularly, to a suspension system applying a bush capable of tuning in combination of elasticity and rigidity.

BACKGROUND

The statements in this section merely provide background information related to the present disclosure and may not constitute prior art.

Generally, a bush includes an elastomer to which a rubber has been applied for the relative movement of the connecting component.

In particular, a vehicle requires steering and durability, etc. together with Riding and Handling (R&H) and Noise, Vibration, Harshness (NVH), such that the need for the bush capable of tuning using rubber characteristics is very large.

For example, the bush is applied to a suspension system of a vehicle in which the relative movement is possible, such as an example of a cross member (or sub-frame), a step bar (or stabilizer bar), or a suspension arm (or lower arm, upper arm), and further, it utilizes the tuning freedom degree of the bush itself, thereby enhancing the entire performance of the vehicle characterized by the R&H/NVH and the steering and durability.

The contents described in Description of Related Art are to help the understanding of the background of the present disclosure, and may include what is not previously known to those skilled in the art to which the present disclosure pertains.

SUMMARY

A bush is an elastic tuning means using a kind of rubber characteristics, and the elastic tuning means should satisfy the target performance for the R&H/NVH/steering/durability of a vehicle depending on the rubber characteristic in which the tuning freedom degree is reduced, such that there is a realistic limitation in that it is difficult to achieve 100% of the target performance until completing the development.

In particular, when the bush is applied to a Coupled Torsion Beam Axle (CTBA) (e.g., a rear wheel CTBA) characterized by a left and right wheel non-independent type suspension system, the bushes is provided with tilting for a lateral force generated upon turning of the vehicle (e.g., about 24° tilting to a mounting portion) for obtaining stability by Toe In induction (i.e., minimization of Toe Out).

Further, the tilting of the bush is provided as a cause for causing a response delay to the initial (−) lateral acceleration in the CTBA, and this reason is because the over-steer tendency of a rear wheel suspension due to a behavior of a yaw of a vehicle body occurs a relative rigid motion. Here, "(−)" of the "(−) lateral acceleration" is an example of the detection code of the acceleration sensor according to the left turning of the vehicle, and "(+)" is an example of the detection code of the acceleration sensor according to the right turning of the vehicle.

As described above, the bush requires a tuning freedom degree having met the characteristics of each of the suspension systems, but has a limitation due to the rubber characteristics that reduces the tuning freedom degree.

The present disclosure provides a bush improving a tuning freedom degree and a suspension system, which combines the rigidity and shape of the bush with the rubber characteristics, thereby enhancing the freedom degree of the tuning limited to the elastic tuning to the rigidity tuning, and in particular, increases the rigidity in an axial direction and the rigidity in a rotational direction and easily reduces the rigidity in a front and rear direction and a vertical direction by enhancing the freedom degree of the tuning using the elasticity/rigidity tuning, thereby satisfying the optimization together with shortening the development load for the target performance of the R&H/NVH/steering/durability desired by the vehicle in the suspension system.

In one form of the present disclosure, a bush includes: a second inner pipe forming a central protrusion in a central section of the second inner pipe; and an outer pipe forming a third protrusion at a first inner side, and a fourth protrusion at a second inner side. In particular, the third and fourth protrusions are arranged outside of the central protrusion. The bush sets the plastic modulus of elasticity of the second inner pipe as the rigidity tuning, sets the rubber modulus of elasticity of a rubber part provided between the second inner pipe and the outer pipe so as to have a value different from the plastic modulus of elasticity as the elastic tuning, and has tuning freedom degree by a combination of the rigidity tuning and the elastic tuning.

As one embodiment, the second inner pipe forms a first protrusion at a position corresponding to the third protrusion, and a second protrusion at a position corresponding to the fourth protrusion. In one form, the first protrusion, the second protrusion, and the central protrusion are arranged along a front and rear direction of a vehicle.

As another embodiment, the second inner pipe is a composite of elastomer using plastic and rubber or urethane, or the second inner pipe is made of engineering plastic adjusting the plastic modulus of elasticity with the content of rubber or adjusting the plastic modulus of elasticity with rubber or urethane.

As another embodiment, an inclination of the central protrusion of the second inner pipe and inclinations of the third protrusion and the fourth protrusion, which face the central protrusion, are arranged to be in the same direction as each other. In another form, the central protrusion has a pipe contact portion, and a width of the pipe contact portion is larger than a width of a protrusion formed at an end part of the second inner pipe.

In other form, the second inner pipe is integrated with a first inner pipe, the rubber part is integrated with the outer pipe, the second inner pipe surrounds the rubber part to be integrated with together, the rubber part provided between the second inner pipe and the outer pipe includes a first void between the first protrusion and the third protrusion and a second void between the second protrusion and the fourth protrusion.

As another embodiment, the first void and the second void are arranged along the front and rear direction of a vehicle, and a cutout is formed on the rubber part at the upper portion/lower portion in the vertical direction of the vehicle.

In other form, the third protrusion and the fourth protrusion of the outer pipe are arranged in the front and rear direction of a vehicle.

In still other form, the outer pipe has a central recess positioned at the central protrusion of the second inner pipe, an inclination of the central recess faces inclinations of a first protrusion and a second protrusion of the second inner pipe, the first protrusion is disposed at a position corresponding to the third protrusion, and the second protrusion is disposed at a position corresponding to the fourth protrusion the inclinations of the central recess, the first protrusion and the second protrusion are arranged in the same direction as each other, the central recess forms a width of a pipe contact portion of the outer pipe, and the width of the pipe contact portion is larger than a width of a protrusion formed at an end part of the second inner pipe.

As one embodiment, the second inner pipe forms the coupling structure and the close contact structure with a first inner pipe, the coupling structure includes a seating groove of the first inner pipe and a seating protrusion of the second inner pipe, and the close contact structure is formed of a contact protrusion processed by serration at the outer diameter of the first inner pipe. The second inner pipe forms the close contact structure with the first inner pipe via a contact protrusion formed on an outer surface of the first inner pipe.

In one form, the second inner pipe is integrated by surrounding a first inner pipe, and the first inner pipe is made of an aluminum material.

Further, the first inner pipe, the second inner pipe, the outer pipe, and the rubber part constituting the bush of the present disclosure for achieving the object have the following characteristics.

As one embodiment, the second inner pipe has the wave formation section, the rubber part has the mass overlapping section, and the mass overlapping section surrounds the wave formation section. The wave formation section is formed of a wave body constituting the intermediate section of the second inner pipe, and the wave body is disposed between the first protrusion and the second protrusion to be formed of a central protrusion formed to be larger than the sizes of the first protrusion and the second protrusion, such that a difference in size to each other forms a wave shape.

As another embodiment, each of the central protrusion, the first protrusion, and the second protrusion is formed with a flat and close contact surface.

In one form, the second inner pipe is provided with a front end body forming the end portion of one side thereof and a rear end body forming the end portion of the other side thereof, and each of the front end body and the rear end body is formed of a circular section surrounding the first inner pipe.

In another form, the second inner pipe and the first inner pipe is provided with a bush anti-rotation structure formed by coupling the seating protrusion of the second inner pipe in the seating groove of the first inner pipe, and a bush adhesive reinforcement structure formed of the contact protrusion formed on the outer circumferential surface of the first inner pipe.

As an embodiment, the mass overlapping section is formed of a deformable body forming the intermediate section of the rubber part, the deformable body is disposed between a front connecting mass and a rear connecting mass to be formed of a main mass for inducing the deformation with respect to the compressive force and the rotational force applied from the second inner pipe with the narrow width thickness of the rubber compared to the height of the rubber perpendicular to the second inner pipe.

As an embodiment, the rubber part is provided with a front end mass forming the end portion of one side thereof, and a rear end mass forming the end portion of the other side, and the outer pipe has an end protrusion flange forming the end portion of one side thereof forming a locking fixing force for the front end mass, and has an end bending flange forming the end portion of the other side thereof forming the adhesive fixing force for the rear end mass.

As an embodiment, each of the rubber part and the outer pipe forms a rubber mass inner diameter structure so as to reinforce the close contact force to each other. The rubber mass inner diameter structure forms the inner diameter of the outer pipe in the same shape with respect to the mass overlapping section forming the intermediate section shape of the rubber part.

Further, a suspension system of the present disclosure for achieving the object includes a bush having the bush modulus of elasticity that is a combination of the plastic modulus of elasticity of engineering plastic forming a second inner pipe and the rubber modulus of elasticity of rubber forming a rubber part, and having tuning freedom degree with the rigidity tuning by the plastic modulus of elasticity and the elastic tuning by the rubber modulus of elasticity; and a trailing arm fastened with a wheel at the opposite side of a vehicle body fastening part formed through the bush.

As an embodiment, the trailing arm is coupled to the end portions of both left and right sides of a torsion beam to be configured as a Coupled Torsion Beam Axle (CTBA).

The bush applied to the suspension system of the present disclosure realizes the following operations and effects by increasing the tuning freedom degree.

Firstly, it is possible to largely increase the tuning freedom degree for the bushes to the rigidity tuning of the metal in addition to the elasticity tuning of the rubber, thereby satisfying the target performance of the R&H/NVH/steering/durability desired in the vehicle through the suspension system, and in particular, it is possible to develop the bush of multiple rigidity and shape optimization suitable for the CTBA, which should resolve the response delay to the initial (−) lateral acceleration. Secondly, it is possible to shorten the development load of the bush desired for satisfying the target performance of the R&H/NVH/steering/durability. Thirdly, it is easy to adjust the rigidity tuning of the bush by using the engineering plastic which may give various rigidity. Fourthly, it is easy to manufacture by applying the method of integrally injecting the engineering plastic into iron or aluminum that forms the inside/outer pipe of the existing bush. Fifthly, it is easy to adjust the coupling force and detaching force of the engineering plastic by using serration or knurling, or engraved/embossing groove. Sixthly, it is easy to form the embossing of the convex/concave shape in the engineering plastic that is integrally injected with the inside or outside iron, thereby easily generating the shearing force desired for compression of the bush and the compressive force desired for rotation of the bush. Seventhly, it is possible to satisfy the target performance of R&H/NVH/steering/durability, thereby saving the cost and weight of the bush by an advantage of the engineering plastic even while having the suitability for various kinds of vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary embodiments of the present disclosure will be described in detail with reference to the accompanying drawings, and since this exemplary embodiment are an example and may be implemented in various different forms by those skilled in the art to which the present disclosure pertains, it is not limited to the embodiment described herein.

Figure 1A:
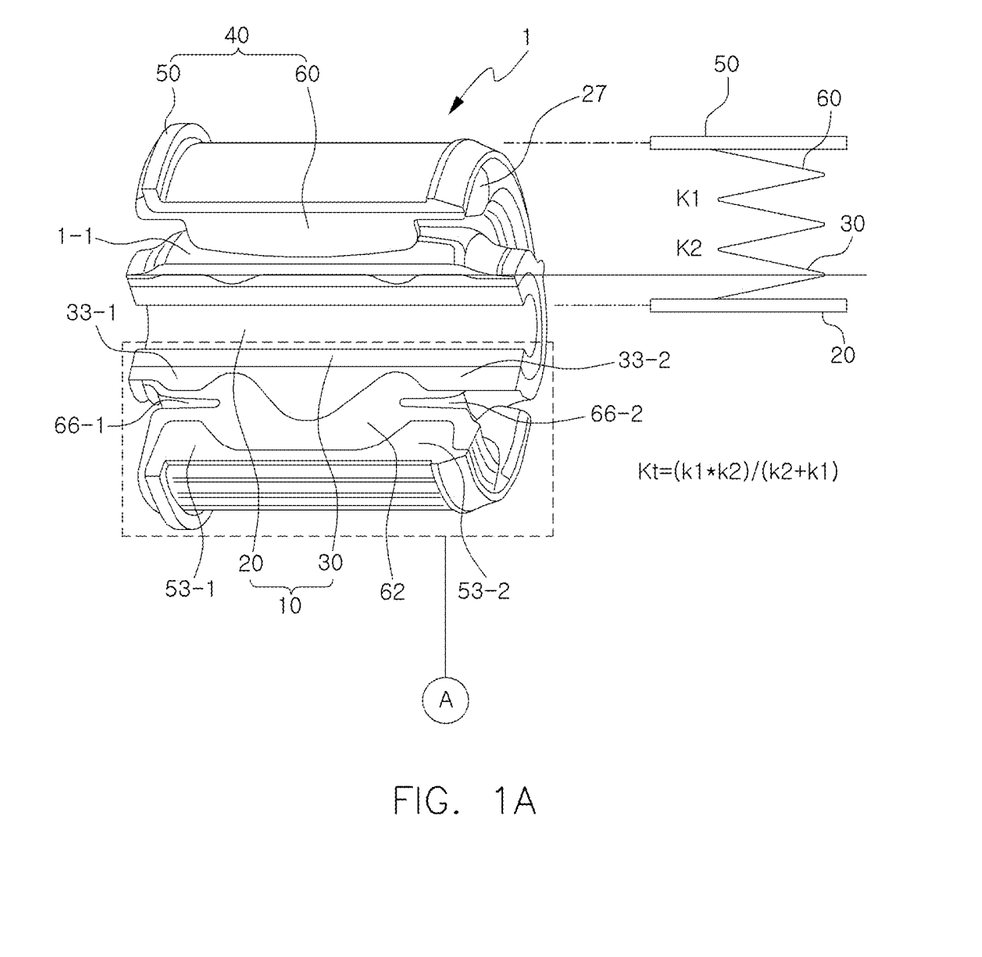
FIG. 1A is a diagram showing a configuration of a bush for improving a tuning freedom degree according to one form of the present disclosure.
Figure 1B:
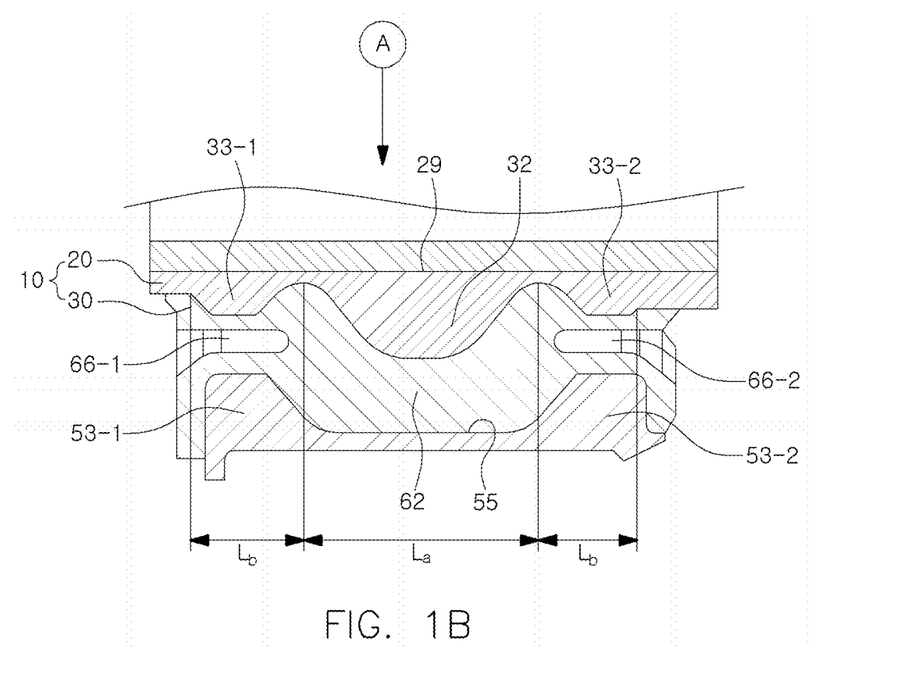
FIG. 1B is a cross-sectional view of part "A" in FIG. 1A.

Referring to FIGS. 1A and 1B, a bush 1 is composed of an inside unit 10 and an outside unit 40.

For example, the inside unit 10 is composed of a hollow pipe type first inner pipe 20 having a predetermined length made of aluminum so as to be fastened with a counter component, and a second inner pipe 30 subject to injection molding or extrusion molding+injection molding so as to be integrated by surrounding the first inner pipe 20.

Particularly, the second inner pipe 30 is made of engineering plastic, and the engineering plastic is made of a plastic raw material made of PA66+GF of Polyamide (PA)+ Glass Fiber (GF) and a rubber of about 1 to 50 wt % or is made of plastic and rubber or urethane elastomer, thereby adjusting the adhesive rigidity of the second inner pipe 30 to the first inner pipe 20 together with tuning the inherent rigidity of the engineering plastic.

For example, the outside unit 40 is composed of a hollow pipe type outer pipe 50 having a predetermined length made of plastic so as to form the appearance of the bush 1, and a rubber part 60 subject to injection molding so as to be integrated with each other by filling a space where the outer pipe 50 and the second inner pipe 30 are formed. In particular, the outer pipe 50 is made of plastic, and the rubber part 60 is made of vulcanized rubber.

Accordingly, the bush 1 forms a bush modulus of elasticity in combination with an engineering plastic property and a rubber property.

The bush modulus of elasticity: $Kt=(K1 \times K2)/(K2+K1)$

Where, "Kt" refers to the bush modulus of elasticity of the bush 1, "K1" refers to the rubber modulus of elasticity of a rubber mass 60, and "K2" refers to a plastic modulus of elasticity of a plastic mass 30.

Accordingly, the bush 1 is characterized by a tuning freedom degree improvement type bush that subjects the plastic modulus of elasticity (K2) to the rigidity tuning while subjecting the rubber modulus of elasticity (K1) to the elastic tuning.

Further, the bush 1 forms a cutout 1-1 on each of the upper and lower portions of the bush body between the second inner pipe 30 and the rubber part 60 in the vertical direction of the vehicle (i.e., the vertical direction with respect to the road surface), has first and second protrusions 33-1, 33-2 in both left and right sections of a central protrusion 32 on the outer circumferential surfaces of both left and right portions of the second inner pipe 30, has third and fourth protrusions 53-1, 53-2 in both left and right sections of a central recess 55 on the inner circumferential surfaces of both left and right portions of the outer pipe 50, and drills first and second voids 66-1, 66-2 on the side surfaces of both left and right portions of the rubber part 60.

For example, the cutout 1-1 induces occurrence of the rotation of the outer pipe 50 to operate so that Toe Out of the vehicle is effectively downsized through the bush 1.

For example, the first protrusion 33-1 of the second inner pipe 30 and the third protrusion 53-1 of the outer pipe 50 are positioned on both left and right sections of the central protrusion 32 at the left end portion of the bush 1 in the front and rear direction of the vehicle, and the second protrusion 33-2 of the second inner pipe 30 and the fourth protrusion 53-2 of the outer pipe 50 are positioned at the right end portion of the bush 1 in the front and rear direction of the vehicle. In this case, the horizontal direction and front and rear direction of the vehicle are defined as an X-axial direction indicating the longitudinal direction of the second inner pipe 30 in the XYW coordinate system of FIG. 3.

Accordingly, the first and second protrusions 33-1, 31-2 and the third and fourth protrusions 53-1, 53-2 may operate to prevent a structural breakage of the first and second pipes 20, 30 as the stopping effect blocking strong front and rear forces that may be generated in the bush 1 in the vehicle passing through a pothole or a bump, etc.

For example, the first void 66-1 of the rubber part 60 is positioned at the left end portion of the bush 1 in the front and rear direction of the vehicle, and the second void 66-2 of the rubber part 60 is positioned at the right end portion of the bush 1 to operate so that the rubber part 60 enhances the durability of the rubber of the main mass 62 by the shearing occurrence induction operating to have the rubber durability advantage upon compression of the bush 1 and further improves the handling of the vehicle by a Toe Out control of the vehicle by the rubber compression occurrence induction upon rotation of the bush 1.

Accordingly, the first and second voids 66-1, 66-2 may exclude from being formed in the entirety of the bush 1 to operate so that the force transfer path of the bush 1 is fully formed between the first and second inner pipes 20, 30 and the outer pipe 50, such that the main mass 62 of the rubber part 60 induces to be compressed close to the vertical direction to the inclined surface with respect to the second inner pipe 30 and the outer pipe 50, thereby implementing optimum performance.

Figure 2:
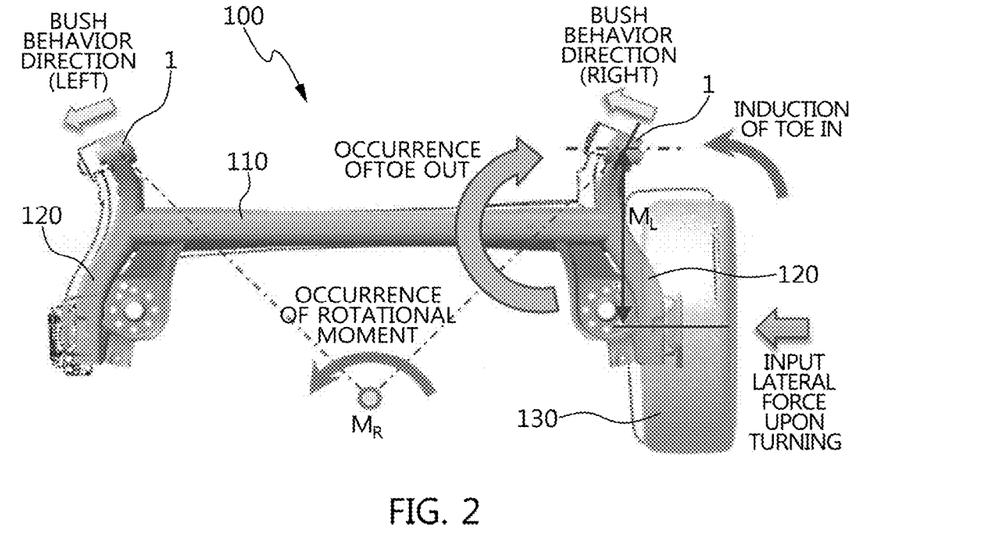
FIG. 2 is a diagram showing a dynamics relationship received by a suspension system to which the tuning freedom degree improvement type bush has been applied according to one form of the present disclosure.

Meanwhile, FIG. 2 shows a suspension system 100 to which the bush 1 has been applied. In this case, the bush 1 fills a space where the first inner pipe 20 and the outer pipe 50 are formed with and second inner pipe 30 and the rubber part 60 to form the bush modulus of elasticity (Kt) with the rubber modulus of elasticity (K1) of the rubber part 60 and the plastic modulus of elasticity (K2) of the second inner pipe 30, such that it is the same as the tuning freedom degree improvement type bush 1.

For example, the suspension system 100 is a Coupled Torsion Beam Axle (CTBA) composed of a trailing arm 120 coupled to both left and right end portions of a torsion beam 110 of a V-sectional or U-sectional or closed-sectional structure and left and right wheels 130, respectively, which is characterized by the left and right wheel non-independent type rear wheel suspension system.

As shown, due to the lateral force generated by the turning, the wheel 130 generates a Toe In induction moment in the bush behavior direction associated with the movement of the trailing arm 120 due to the rotational moment of a rotational moment center ($M_R$) formed on the left and right bushes 1 together with the a Toe Out generating rotational force indicating the Toe Out tendency due to the arm length ($M_L$) of the trailing arm 120 for connecting the bush 1 with the fastener of the wheel 130.

In such a moment dynamics relationship, the bush 1 has the bushing modulus of elasticity (Kt) that is a combination of the elastic tuning and the rigidity tuning, thereby expressing as the bush characteristics an increase in the axial directional rigidity and the rotation directional rigidity and a reduction in the vertical directional rigidity. Then, the bush characteristics reinforce the Toe In induction moment tendency of the suspension system 100, thereby also enhancing the performance for the R&H/NVH/steering/durability while stabilizing the wheel 130 by the Toe In.

Particularly, the performance satisfaction of the suspension system 100 for the reinforcement of the Toe In stability of the bush 1 and R&H/NVH/steering/durability may be implemented as a bush shape optimization structure and a bush tuning optimization structure by using the shape of the second inner pipe 30 as a basic structure.

Meanwhile, FIGS. 3 to 8 show an example for specifically implementing the characteristics of the bush 1.

Figure 3:
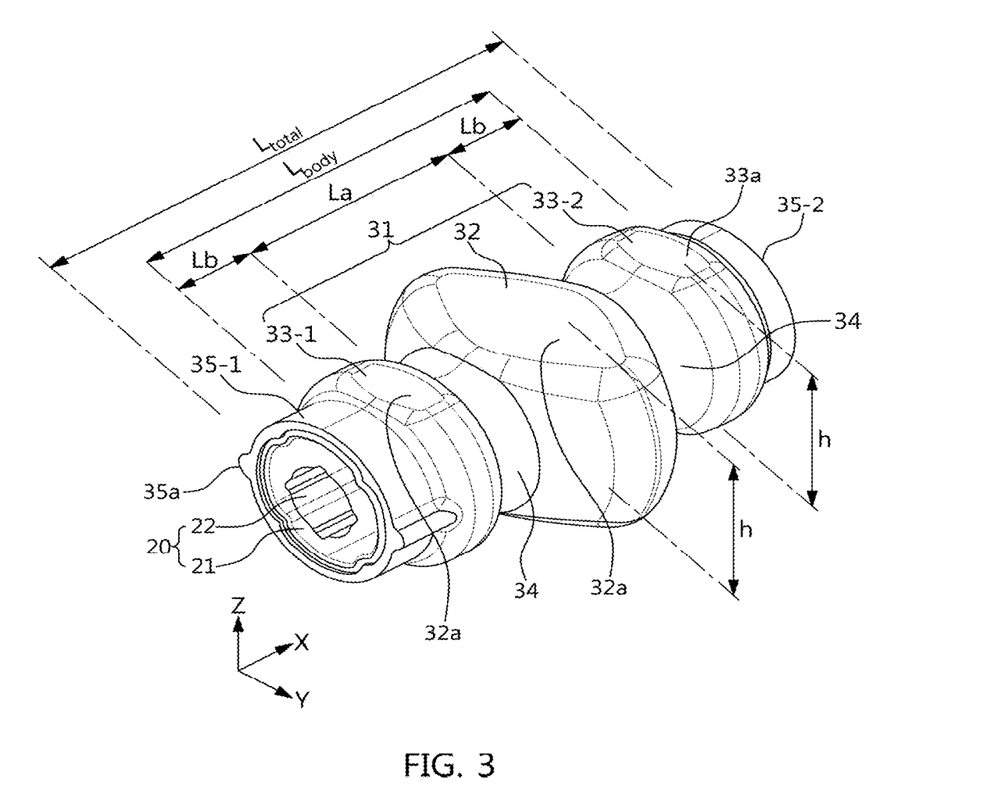
FIG. 3 is a perspective diagram showing an inside unit constituting the tuning freedom degree improvement type bush according to one form of the present disclosure.
Figure 4A:
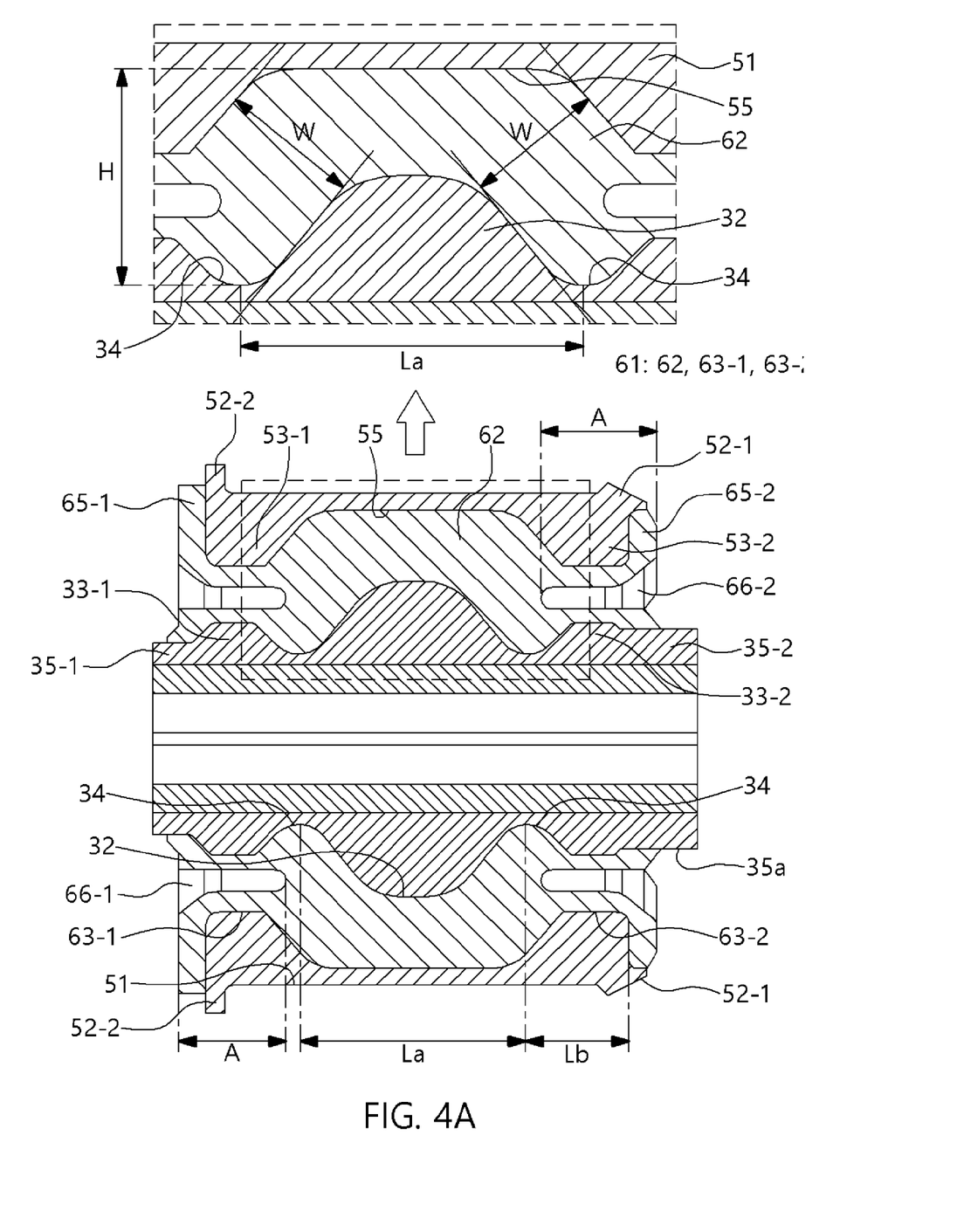
FIG. 4A is a cross-sectional diagram showing an inside/outside unit exemplifying a bush multiple rigidity structure of the tuning freedom degree improvement type bush according to one form of the present disclosure.
Figure 4B:
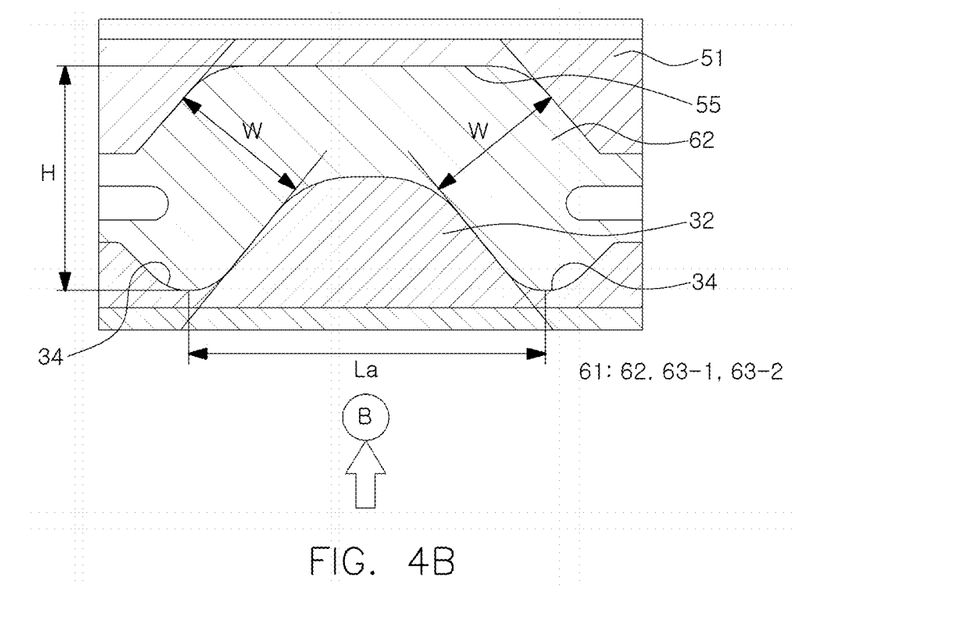
FIG. 4B is a cross-sectional view of part "B" in FIG. 4A.
Figure 5A:
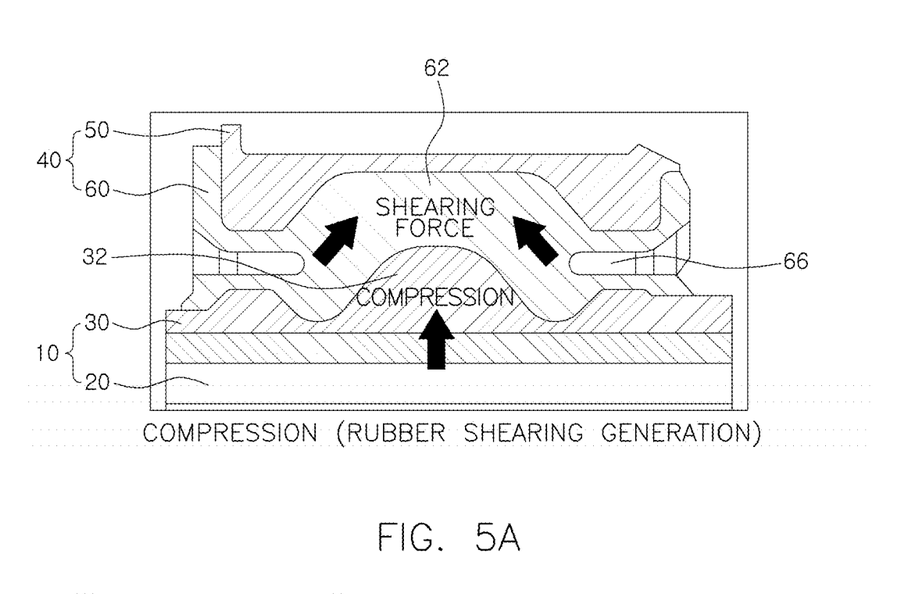
FIGS. 5A and 5B are diagrams respectively showing an example in which a rubber shearing force upon compression of the bush and a rubber compressive force upon rotation of the bush are generated, respectively, through the bush multiple rigidity structure of the inside/outside unit according to one form of the present disclosure.
Figure 5B:
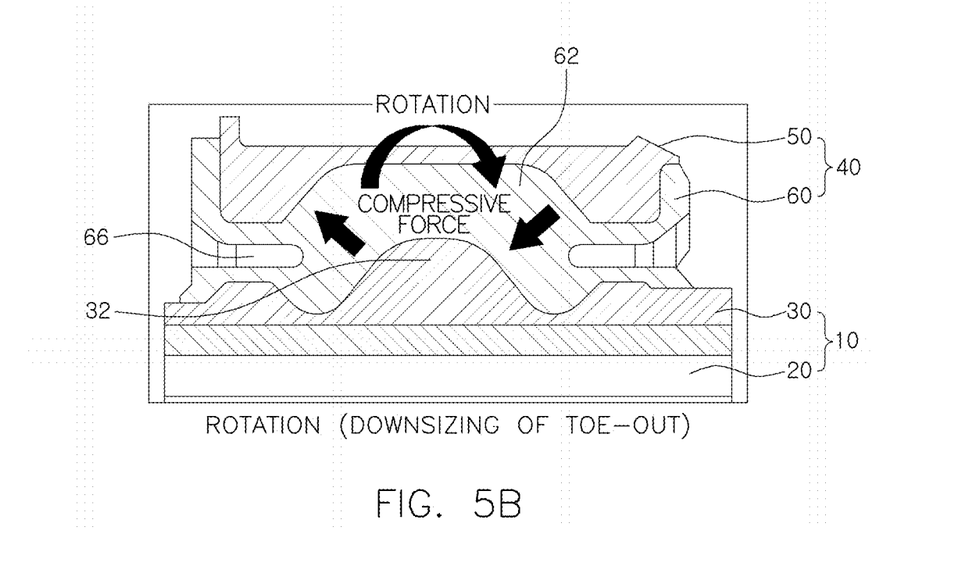

For example, referring to FIGS. 3 to 5, the bush 1 is composed of the second inner pipe 30 integrated with the first inner pipe 20 by including the central protrusion 32, and the outer pipe 50 including the third protrusion 53-1 at the inner one side thereof and the fourth protrusion 53-2 at the inner other side thereof, and particularly, the bush multiple rigidity structure, which is implemented from the shape of the second inner pipe 30 and the outer pipe 50 and the rubber part 60 associated therewith, is exemplified.

Referring to FIGS. 3 to 5, the first inner pipe 20 is made of an aluminum material and includes a protrusion coupling structure of a seating groove 27 and a serration structure of a contact protrusion 29. The second inner pipe 30 forms the central protrusion 32 in the front and rear direction of the vehicle, and constitutes the first protrusion 33-1 at one side of both side surfaces of the central protrusion 32 and the second protrusion 33-2 at the other side thereof in the front and rear direction of the vehicle, and includes a groove coupling structure of a seating protrusion 37. The outer pipe 50 forms a central recess 55 in the front and rear direction of the vehicle, and constitutes the third protrusion 53-1 at the inner one side of the central recess 55 and the fourth protrusion 53-2 at the inner other side thereof in the front and rear direction of the vehicle. The rubber part 60 constitutes the first void 66-1 between the first protrusion 33-1 and the third protrusion 53-1 and the second void 66-2 between the second protrusion 33-2 and the fourth protrusion 53-2 in the front and rear direction of the vehicle.

Particularly, the second inner pipe 30 is a composite of plastic and elastomer (rubber/urethane), and the inclined surface of the inclined structure of the central protrusion 32 has the same direction as the inclined surface of the inclined structure of the third protrusion 53-1 and the fourth protrusion 53-2 of the outer pipe 50, and the width ($L_a$) of the pipe contact portion of the central protrusion 32 is formed to be larger than the width ($L_b$) of the end of the protrusion.

Further, in the outer pipe 50, the inclined surface of the inclined structure of the central recess 55 is the same direction as the inclined surface of the inclined structure of the first protrusion 33-1 and the second protrusion 33-2 of the second inner pipe 30, and the widths ($L_a$) of the pipe contact portions of the third protrusion 53-1 and the fourth protrusion 53-2 are formed to be larger than the width ($L_b$) of the end of the protrusion.

Further, the rubber part 60 constitutes the cutout 1-1 on the upper portion and the lower portion of the rubber part 60 in the vertical direction of the vehicle.

Referring to FIG. 3, the second inner pipe 30 is composed of a wave body 31 of the second inner pipe 30 for surrounding a hollow body 21 formed with a shaft hole 22 of the first inner pipe 20 to be integrated with the first inner pipe 20, and front and rear end bodies 35-1, 35-2. Accordingly, the shape and layout of the second inner pipe 30 are specified through the wave body 31 and the front and rear end bodies 35-1, 35-2.

Specifically, considering the shape of the second inner pipe 30, the wave body 31 is divided into the central protrusion 32, the first and second protrusions 33-1, 33-2, and a narrow connecting body 34 to form the wave shape in the front and rear axial direction (x (i.e., front and rear direction of the vehicle) of the xyz coordinate system), while the front and rear end bodies 35-1, 35-2 form a plain shape on the first and second protrusions 33-1, 33-2.

Particularly, the central protrusion 32, the first and second protrusions 33-1, 33-2, the narrow connecting body 34, and the front and rear end bodies 35-1, 35-2 are subject to the injection molding or the extrusion+injection molding with respect to the first inner pipe 20 to be form to surround the outer diameter of the hollow body 21.

For example, the central protrusion 32 forms an intermediate section of the second inner pipe 30, the first protrusion 33-1 and the front end body 35-1 are connected with each other in front of the central protrusion 32 to form the front section of the second inner pipe 30, and the second protrusion 33-2 and the rear end body 35-2 are connected with each other in the rear portion of the central protrusion 32 to form the rear section of the second inner pipe 30.

Particularly, the size of the width of the central protrusion 32 is formed to be larger than the sizes of the widths of the first protrusion 33-1 and the second protrusion 33-2, the sizes of the widths of the first protrusion 33-1 and the second protrusion 33-2 are formed equally, and the central protrusion 32 and the first protrusion 33-1, and the central protrusion 32 and the second protrusion 33-2 are connected by the narrow connecting body 34, respectively.

Accordingly, the first protrusion 33-1 connected with the central protrusion 32 by the narrow connecting body 34 and the second protrusion 33-2 connected with the central protrusion 32 by the narrow connecting body 34 form the wave shape section in the axial direction (x in the xyz coordinate system) of the second inner pipe 30 (see FIGS. 4A and 4B). In this case, the wave shape sets the vertex of the central protrusion 32 as the maximum height to set the vertices of the first protrusion 33-1 and the second protrusion 33-2 connected by the narrow connecting body 34 to the minimum height.

For example, the front end body 35-1 surrounds the front end section of the hollow body 21 so as to be connected in the first protrusion 33-1 to be integrated with the first inner pipe 20, and the rear end body 35-2 surrounds the rear end section of the hollow body 21 so as to be connected in the second protrusion 33-2 to be integrated with the first inner pipe 20. In this case, each of the front end body 35-1 and the rear end body 35-2 is formed of a circular section that surrounds the hollow body 21 of the first inner pipe 20.

Particularly, the central protrusion 32, the first protrusion 33-1, and the second protrusion 33-2 are configured in the front and rear direction of the vehicle, and the inclined surface of the inclined structure of the central protrusion 32 is the same direction as the inclined surface of the inclined structure of the third protrusion 53-1 and the fourth protrusion 53-2 of the outer pipe 50, and the width ($L_a$) of the pipe contact portion of the central protrusion 32 is formed to be larger than the width ($L_b$) of the end of the protrusion.

Further, the front end body 35-1 is formed with a rib 35a for reinforcing its own rigidity and adhesion to the rubber part 60, and the rib 35a forms two ribs having the positions opposite to each other in pair on the front end body 35-1.

Specifically, considering the layout of the second inner pipe 30, the wave length ($L_{body}$) of the wave body 31 is set to about 0.7 to 0.8 when the plastic mass length ($L_{total}$) which is the total length of the second inner pipe 30, is set to 1, thereby forming the mass overlapping section where the second inner pipe 30 is surrounded by the rubber part 60 as wide as possible.

Particularly, the wave length ($L_{body}$) of the wave body 31 is divided into the width ($L_a$) of the pipe contact portion of the central protrusion 32, the width ($L_b$) of the end of the protrusion of the first protrusion 33-1, and the width ($L_b$) of the end of the protrusion of the second protrusion 33-2, and the width ($L_a$) of the pipe contact portion is formed of about 60 to 70% relative to the width ($L_b$) of the end of the protrusion when the wave length ($L_{body}$) is set to 100%. This reason is because the central protrusion 32 has a larger size than the first and second protrusions 33-1, 33-2 so as to lead to the elastic deformation of the bush 1.

Accordingly, the mass overlapping section associates the wave length ($L_{body}$) with the rubber part 60 to operate so that the central protrusion 32 having the width ($L_a$) of the pipe contact portion larger than the width ($L_b$) of the end of the protrusion enhances the rigidity of the axial direction (x in the xyz coordinate system) and the rotational direction (y (i.e., a left and right width direction of the vehicle) in the xyz coordinate system) against an external force (i.e., a lateral force by the turning).

Further, each of the central protrusion 32 and the first and second protrusions 33-1, 33-2 of the wave body 31 are formed with close contact surfaces 32a, 33a, and the close contact surfaces 32a, 33a form the flat upper and lower portions on the wave body 31, thereby reducing the width length (h) of the wave body 31 in the width direction (z i.e., the vertical direction of the vehicle) in the xyz coordinate system) of the second inner pipe 30. In this case, the width height (h) of the close contact surface 32a of the central protrusion 32 and the width height (h) of the close contact surface 33a of the first and second protrusions 33-1, 33-2 are formed equally. Further, the close contact surfaces 32a, 33a also provide an additional function of reinforcing the adhesive force between the wave body 31 and the rubber part 60.

As described above, the wave body 31 is configured so that the radius length (y in the xyz coordinate system) is formed to be larger than the width length (h) by the close contact surfaces 32a, 33a, such that the second inner pipe 30 may enhance the rigidity in the axial direction (x in the xyz coordinate system) and the rotational direction (y in the xyz coordinate system). On the other hand, the wave body 31 is configured so that the width length (h) by the close contact surfaces 32a, 33a is formed to be smaller than the radius length, such that the second inner pipe 30 may weaken the rigidity in the front and rear direction (x in the xyz coordinate system) and the vertical direction (z in the xyz coordinate system).

Referring to the bush multiple rigidity structure of FIG. 4, the bush multiple rigidity structure is formed by connecting the second inner pipe 30, the outer pipe 50, and the rubber part 60.

In the bush section structure, the space between the first inner pipe 20 and the outer pipe 50 is filled with the second inner pipe 30 and the rubber part 60 forming the rubber modulus of elasticity (K1) (see FIGS. 1A and 1B). In this case, the second inner pipe 30 is integrated with the first inner pipe 20, the rubber part 60 is integrated with the outer pipe 50, and the second inner pipe 30 and the rubber part 60 are integrated by surrounding each other.

Specifically, the outer pipe 50 is composed of a body housing 51 formed of a hollow pipe shape, an end protrusion flange 52-1 formed in the front direction (x in the xyz coordinate system) of the body housing 51, an end bending flange 52-2 formed in the rear direction (x in the xyz coordinate system) of the body housing 51, the third protrusion 53-1 connected with the end protrusion flange 52-1, the fourth protrusion 53-2 connected with the end bending flange 52-2, and the central recess 55 laterally forming the end protrusion flange 52-1 and the end bending flange 52-2 in the intermediate section of the body housing 51.

For example, the inner diameter of the body housing 51 forms the rubber mass inner diameter structure in the same shape as that of a deformable body 61 of the rubber part 60, thereby reinforcing the close contact coupling force for the rubber part 60. That is, the rubber mass inner diameter structure of the body housing 51 is formed so that the intermediate section diameter closely contacting the main mass 62 of the rubber part 60 is larger than the front and rear section diameter closely contacting each of the front and rear end masses 65-1, 65-2 of the rubber part 60.

For example, the end protrusion flange 52-1 is retracted to narrow the diameter of the body housing 51 to form a locking fixing force for the front end mass 65-1 of the rubber part 60. The end bending flange 52-2 is formed concentrically so as to widen the diameter of the body housing 51 at the other end portion of the body housing 51 to form the adhesive fixing force for the rear end mass 65-2 of the rubber part 60.

Accordingly, the outer pipe 50 reinforces the close contact coupling force with the rubber part 60 by the rubber mass inner diameter structure of the body housing 51, reinforces the locking fixing force with the rubber part 60 with the bending structure of the end protrusion flange 52-1, and reinforces the adhesive fixing force with the rubber part 60 with the protrusion structure of the end bending flange 52-2.

For example, the third and fourth protrusions 53-1, 53-2 and the central recess 55 are configured in the front and rear direction of the vehicle. Particularly, the central recess 55 has the width ($L_a$) of the pipe contact portion larger than the width ($L_b$) of the end of the protrusion, and the inclined surface of the inclined structure of the central recess 55 is formed in the same direction as the inclined surfaces of the inclined structures of the first protrusion 33-1 and the second protrusion 33-2.

Accordingly, the central recess 55 and the third and fourth protrusions 53-1, 53-2 of the outer pipe 50 are integrated by surrounding the central protrusion 32 of the second inner pipe 30 and the first and second protrusions 33-1, 33-2 to operate so as to prevent the structural breakage of the first and second inner pipes 20, 30 by the stopping effect blocking the strong front and rear force that may be generated in the bush 1 in the vehicle passing through a pothole or a bump, etc.

Further, the outer pipe 50 does not form the conventional structure of the cutout groove or slit applied to the body housing 51 in order to increase the coupling force with the rubber part 60, thereby facilitating the optimization of the shape of the outer pipe.

Specifically, the rubber part 60 is composed of the deformable body 61, the front and rear end masses 65-1, 65-2, and first and second voids 66-1, 66-2.

For example, the deformable body 61 may form a front connecting mass 63-1 at one side of the main mass 62 and form a rear connecting mass 63-2 at the other side thereof, thereby forming the mass overlapping section with respect to the wave body 31 of the second inner pipe 30 together with the rubber mass inner diameter structure with respect to the body housing 51 of the outer pipe 50. In this case, each of the front and rear connecting masses 63-1, 63-2 is connected at the main mass 62 so as to form a narrower section than the main mass 62.

Particularly, the main mass 62 increases the stress response of the rubber part 60 by adjusting the shape by the rubber height (H) and the rubber thickness (W). In this case, the rubber height (H) applies the protrusion portion facing the narrow connecting body 34 of the second inner pipe 30 as a vertical height reference surface, and the rubber thickness (W) applies the side surface portion facing the central protrusion 32 of the second inner pipe 30 as a side surface thickness reference surface. Further, the stress response means that the shearing force and the compressive force in magnitude are generated differently from each other against the external force.

For this purpose, when the rubber height (H) is set to 1, the rubber thickness (W) of the main mass 62 is set to 0.6 to 0.8.

For example, the front and rear end masses 65-1, 65-2 are integrated with the front and rear end bodies 35-1, 35-2 of the second inner pipe 30. Particularly, the front end mass 65-1 forms a locking fixing force with the end bending flange 52-1 of the outer pipe 50, and the rear end mass 65-2 forms an adhesive fixing force with the end protrusion flange 52-2 of the outer pipe 50.

For example, the first and second voids 66-1, 66-2 are formed in an empty space having a predetermined length connected to the deformable body 61 at each of the front and rear end masses 65-1, 65-2, thereby further increasing the stress response of the rubber mass 60 while excluding the force transfer path of the bush 1 from being formed in the entirety of the bush 1. Particularly, the cutout length (A) of the first and second voids 66-1, 66-2 is formed of the length close to the main mass 62 at each of the front and rear connecting masses 63-1, 63-2 of the deformable body 61.

Therefore, the first and second voids 66-1, 66-2 fully form the force transfer path between the first and second inner pipes 20, 30 and the outer pipe 50 to induce so that the main mass 62 of the rubber part 60 is compressed close to the direction perpendicular to the inclined surface with respect to the second inner pipe 30 and the outer pipe 50, thereby implementing optimum performance of the bush 1. Further, the first and second voids 66-1, 66-2 operates to improve the handling of the vehicle by a Toe Out control of the vehicle by the rubber compression occurrence induction upon rotation of the bush 1 even while the rubber part 60 operates to enhance the rubber durability of the main mass 62 by the shearing occurrence induction operating to have the rubber durability advantage upon compression of the bush 1.

Referring to FIGS. 5A and 5B, the stress response of the bush 1 is exemplified by the generation of the shearing force and the generation of the compressive force. In this case, the generation of the shearing force and the generation of the compressive force are based on the behavior of the bush 1 by the dynamics relationship of the lateral force according to the turning (see FIG. 2).

Referring to the bush compression state (z in the xyz coordinate system) at the left side of FIG. 5A, the compression progresses with a tendency of pushing the rubber part 60 from the second inner pipe 30. Then, the second inner pipe 30 transfers the compressive force generated in the central protrusion 32 of the wave body 31 to the rubber part 60, and the rubber part 60 generates the shearing force due to the compressive force in the main mass 62.

Specifically, the main mass 62 concentrates the compressive force of the central protrusion 32 on the rubber thickness (W), which is a relatively thin portion due to a difference between the rubber height (H) and the rubber thickness (W), thereby inducing the generation of the shearing force against (or pushed) the compression direction (e.g., radius direction) of the central protrusion 32. Accordingly, the bush 1 may have a reduction in the compressive force through the shearing force of the rubber part 60, thereby enhancing the durability of the rubber.

On the other hand, referring to the bush rotation state (y in the xyz coordinate system) at the right side of FIG. 5B, the outer pipe 50 is fixed to the suspension system 100 (see FIG. 2), and the first inner pipe 20 is fixed to the vehicle body, such that the rotation occurs in the outer pipe 50 fixed to the suspension system 100.

Accordingly, the bush rotation state progresses a tendency of compressing the rubber part 60 in the second inner pipe 30. Then, the second inner pipe 30 transfers the rotational force generated in the central protrusion 32 of the wave body 31 to the rubber part 60, and the rubber part 60 generates the compressive force by the rotational force in the main mass 62 of the deformable body 61.

Specifically, the main mass 62 concentrates the rotational force of the main wave 32 on the rubber thickness (W), which is a relatively thin portion due to a difference between the rubber height (H) and the rubber thickness (W), thereby inducing the generation of the compressive force against (or pushed) the rotational direction (e.g., clockwise) of the main wave 32. Accordingly, the bush 1 has a reduction in the rotational force through the compressive force of the rubber part 60, such that the suspension system 100 (see FIG. 2) may have a tendency of increasing the Toe In due to the downsizing of the Toe Out.

Figure 6A:
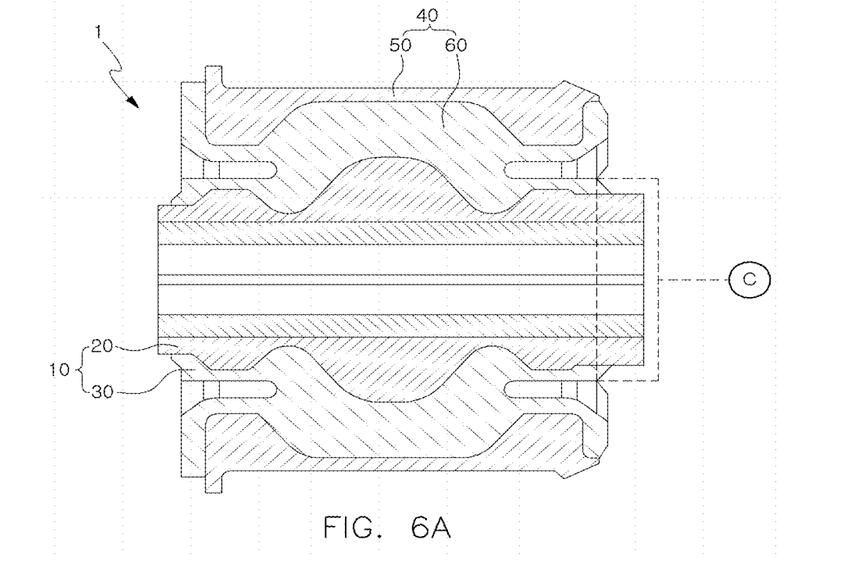
FIG. 6A is a cross-sectional view of a bush rotation prevention structure of the inside unit according to one form of the present disclosure.
Figure 6B:
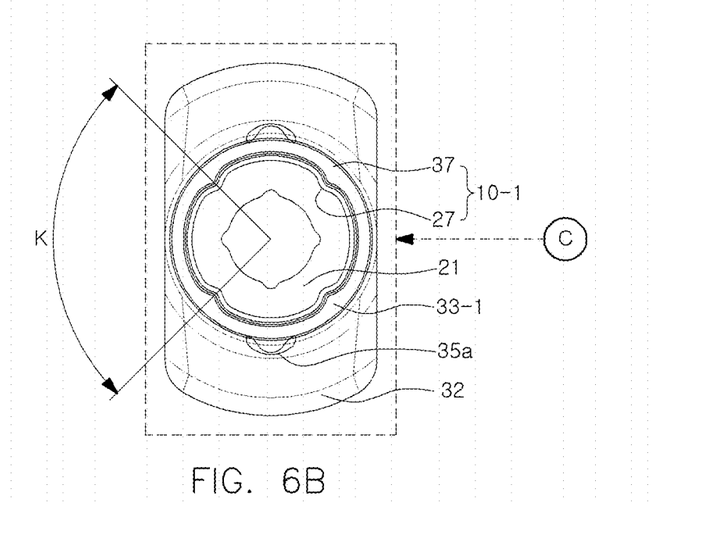
FIG. 6B is a diagram illustrating part "C" in FIG. 6A.
Figure 7A:
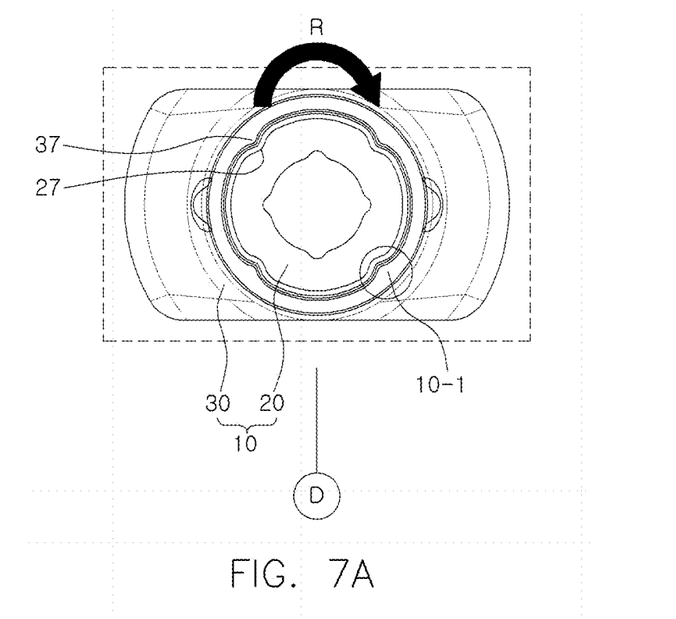
FIGS. 7A and 7B are diagrams respectively showing an operation state of the bush rotation prevention structure according to one form of the present disclosure.
Figure 7B:
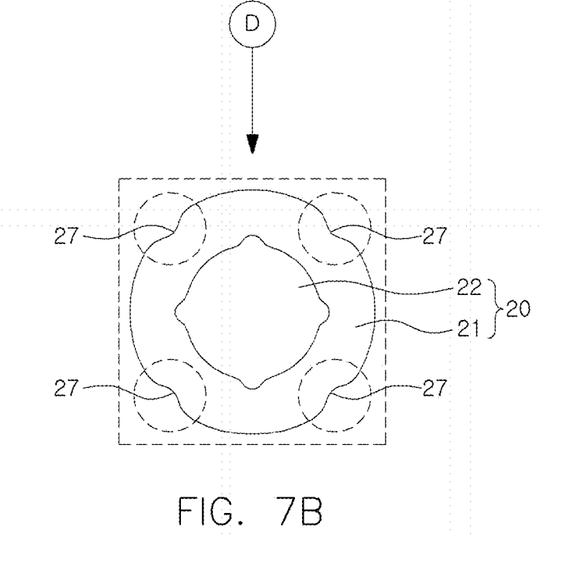
Figure 8A:
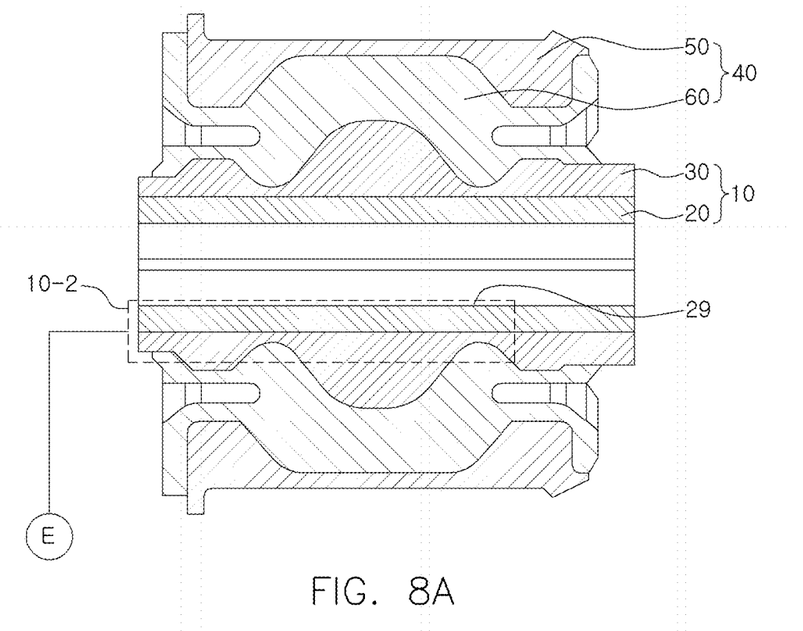
FIG. 8A is a diagram showing an example of the bush rotation prevention structure of the inside unit according to one form of the present disclosure.
Figure 8B:
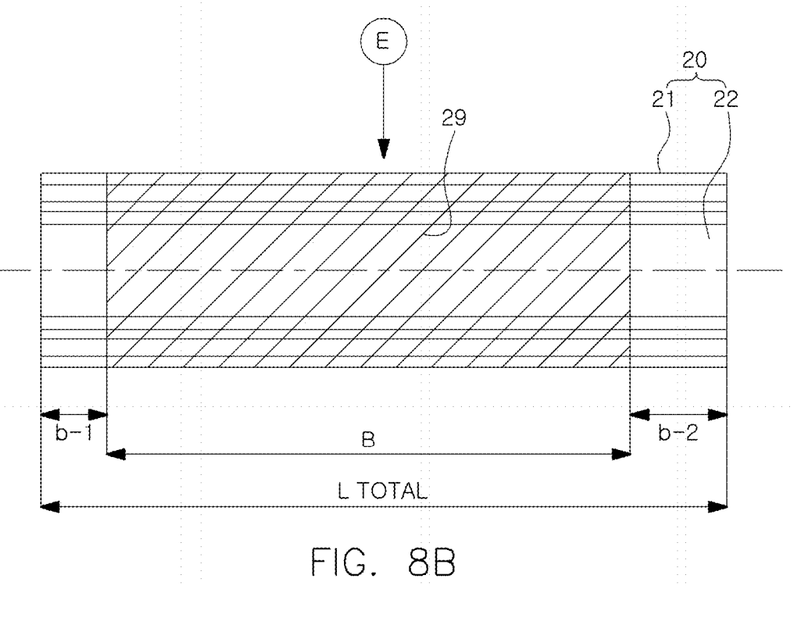
FIG. 8B is an enlarged view of part "E" in FIG. 8A.

Meanwhile, FIGS. 6 to 8 show that a bush anti-rotation structure 10-1 for a bush coupling optimization structure by the connection of the first inner pipe 20 and the second inner pipe 30 in the bush 1 is formed of a coupling structure, and the bush adhesive reinforcement structure 10-2 is applied as a close contact structure.

Referring to FIGS. 6A and 6B, the bush anti-rotation structure 10-1 is applied to the hollow body 21 of the first inner pipe 20 and the front end body 35-1 of the second inner pipe 30. For example, it is applied as the bush anti-rotation structure 10-1 by forming the seating groove 27 in the hollow body 21, forming the seating protrusion 37 on the front end body 35-1, and mutually coupling the seating groove 27 and the seating protrusion 37.

Particularly, as shown in FIG. 6B, the seating groove 27 is formed by striking about a "V" groove shape on the outer diameter of the hollow body 21, and the seating protrusion 37 is formed by molding a "V" groove shape on the inner diameter of the front end body 35-1. Further, the seating groove 27 and the seating protrusion 37 have a predetermined spacing angle (K) for reinforcing the coupling force and are formed in plural but may be formed in four.

Referring to FIGS. 7A and 7B, the bush anti-rotation structure 10-1 suppresses the pipe rotational force (R) of the first inner pipe 20 due to the component in a fastened state (e.g., the trailing arm 120) (see FIG. 2). Accordingly, the rotation tendency of the first inner pipe 20 relative to the second inner pipe 30 generated by the pipe rotational force (R) may be inevitably suppressed by the second inner pipe 30 through the seating protrusion 37 coupled to the seating groove 27.

Referring to FIGS. 8A and 8B, the bush adhesive reinforcement structure 10-2 is applied to the hollow body 21 of the first inner pipe 20. For example, the hollow body 21 forms a contact protrusion 29 formed on the outer circumferential surface thereof, and the contact protrusion 29 increases the coupling force between the second inner pipe 30 and the first inner pipe 20, which are formed by injection-molding on the hollow body 21.

Particularly, the shape of the contact protrusion 29 is formed of serration or knurling, but may be formed of an engraved/embossing groove. Further, the formation section of the contact protrusion 29 is set to the contact protrusion length (B) of about 0.7 to 0.8 in a state having excluded the end lengths b-1, b-2 of both left and right sides when the plastic mass length ($L_{total}$), which is the entire length of the inner pipe 20, is set to 1, thereby forming the coupling increment section where the first inner pipe 20 is surrounded by the second inner pipe 30 as wide as possible.

Accordingly, the first inner pipe 20 and the second inner pipe 30 may be the coupling increment section, thereby easily adjusting the detachable force even while strongly maintaining the coupling force of the second inner pipe 30 to the first inner pipe 20.

Figure 9A:
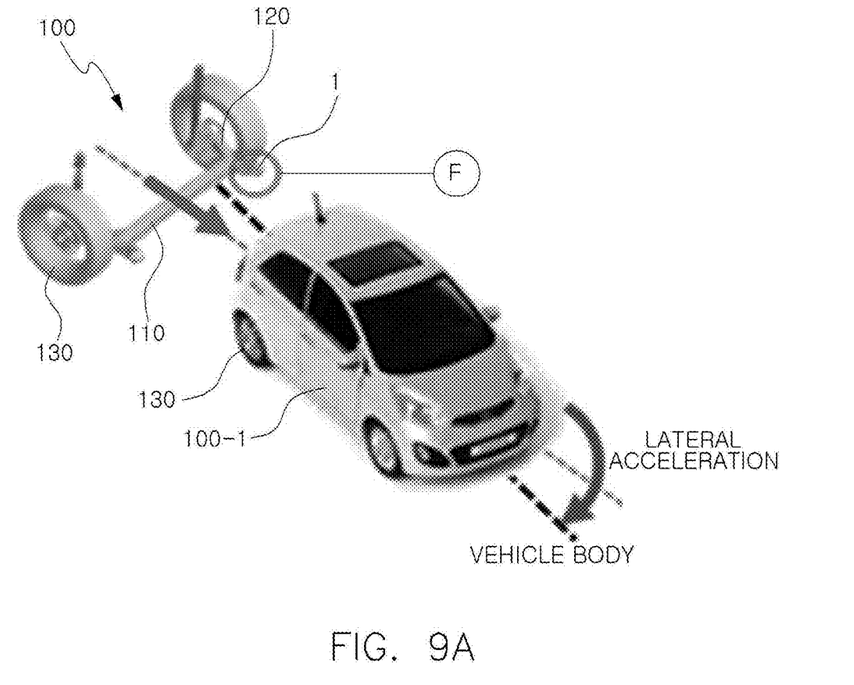
FIGS. 9A and 9B are diagrams showing a suspension system implemented with the tuning freedom degree improvement type bush according to one form of the present disclosure has been applied.
Figure 9B:
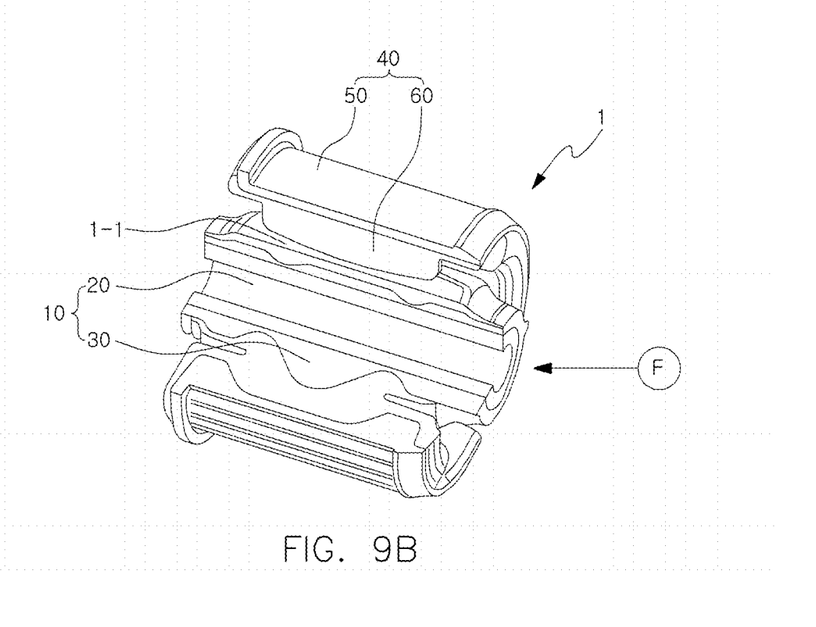

Meanwhile, FIGS. 9A and 9B show the suspension system 100 of the vehicle 100-1. As shown, the suspension system 100 is a rear wheel suspension system of the vehicle 100-1 applying the bush 1 (component "F" in FIGS. 9A and 9B).

Specifically, the bush 1 has the first inner pipe 20 and the second inner pipe 30 as the inside unit 10, has the outer pipe 50 and the rubber part 60 as the outside unit 40, and uses the plastic modulus of elasticity (K2) of the second inner pipe 30 and the rubber modulus of elasticity (K1) of the rubber part 60 as the bush modulus of elasticity (Kt), such that it is the same as the tuning freedom degree improvement type bush 1 described with reference to FIGS. 1 to 8.

Specifically, the suspension system 100 is composed of the trailing arm 120 coupled to both left and right end portions of the torsion beam 110 of a V-sectional or U-sectional or closed-sectional structure and the left and right wheels 130, respectively, and the bush 1 applied to the trailing arm 120, which is characterized by the left and right wheel non-independent type rear wheel suspension system as the Coupled Torsion Beam Axle (CTBA).

Accordingly, since the suspension system 100 is the same as the suspension system 100 of FIG. 2, it is possible to stabilize the vehicle 100-1 by satisfying the performance for the R&H/NVH/steering/durability while reinforcing the stability of the wheel 130 through the Toe In tendency by an operation of the bush 1 at the lateral force according to the turning.

As described above, the tuning freedom degree improvement type bush 1 applied to the suspension system 100 according to the present embodiment has the bush modulus of elasticity that is a combination of the plastic modulus of elasticity of the second inner pipe 30 and the rubber modulus of elasticity of the rubber part 60, and increases the tuning freedom degree by combining the rigidity tuning by the plastic modulus of elasticity with the elastic tuning by the rubber modulus of elasticity, thereby shortening the development load for optimizing the target performance of the R&H/NVH/steering/durability even while easily enhancing the axial directional rigidity and the rotational directional rigidity and easily reducing the front and rear directional rigidity and the vertical directional rigidity.

What is claimed is:
1. A bush, comprising:
   a second inner pipe forming a central protrusion in a central section of the second inner pipe;
   an outer pipe forming a third protrusion at a first inner side and a fourth protrusion at a second inner side, wherein the third and fourth protrusions are arranged outside of the central protrusion; and
   a rubber part provided between the second inner pipe and the outer pipe,
   wherein the outer pipe includes:
     an end protrusion flange to form a locking fixing force for a front end mass of the rubber part, and
     an end bending flange to form an adhesive fixing force for a rear end mass of the rubber part,
   wherein the second inner pipe forms: a first protrusion at a position corresponding to the third protrusion, and a second protrusion at a position corresponding to the fourth protrusion,
   wherein the central protrusion, the first protrusion and the second protrusion are connected to each other forming a wave-shaped body of the second inner pipe and each comprise at least one of a flat upper surface or a flat lower surface such that a radius length of the central protrusion, the first protrusion and the second protrusion is greater than a width length thereof.

2. The bush of claim 1,
wherein the first protrusion, the second protrusion, and the central protrusion are arranged along a front and rear direction of a vehicle.

3. The bush of claim 1,
wherein the rubber part comprises: a first void between the first protrusion and the third protrusion and a second void between the second protrusion and the fourth protrusion.

4. The bush of claim 3,
wherein the first void and the second void are arranged along a front and rear direction of a vehicle.

5. The bush of claim 4,
wherein a cutout is formed on the rubber part at an upper portion and a lower portion of the rubber part along a vertical direction of the vehicle.

6. The bush of claim 1,
wherein the second inner pipe is a composite of elastomer using plastic and rubber or urethane.

7. The bush of claim 1,
wherein an inclination of the central protrusion of the second inner pipe and inclinations of the third and fourth protrusions, which are configured to face the central protrusion, are arranged to be in the same direction as each other.

8. The bush of claim 1,
wherein the central protrusion has a pipe contact portion, and a width of the pipe contact portion is greater than a width of a protrusion formed at an end part of the second inner pipe.

9. The bush of claim 1,
wherein the third protrusion and the fourth protrusion are arranged in a front and rear direction of a vehicle.

10. The bush of claim 1, wherein:
the outer pipe has a central recess positioned at the central protrusion of the second inner pipe,
an inclination of the central recess faces inclinations of a first protrusion and a second protrusion of the second inner pipe,
the first protrusion is disposed at a position corresponding to the third protrusion, and the second protrusion is disposed at a position corresponding to the fourth protrusion,
the inclinations of the central recess, the first protrusion and the second protrusion are arranged in the same direction as each other, and
the central recess forms a width of a pipe contact portion of the outer pipe and the width of the pipe contact portion is greater than a width of a protrusion formed at an end part of the second inner pipe.

11. The bush of claim 1,
wherein the second inner pipe forms a coupling structure of a first inner pipe, the coupling structure includes a seating groove of the first inner pipe and a seating protrusion of the second inner pipe.

12. The bush of claim 1,
wherein the second inner pipe forms a close contact structure with a first inner pipe via a contact protrusion formed on an outer surface of the first inner pipe.

13. The bush of claim 1,
wherein the second inner pipe surround a first inner pipe to be integrated with together, and the first inner pipe is made of an aluminum material.

14. A suspension system, comprising:
the bush of claim 1, wherein the bush is configured to:
provide a bush modulus of elasticity that is a combination of a plastic modulus of elasticity of engineering plastic forming the second inner pipe and a rubber modulus of elasticity of rubber forming the rubber part, and
provide a tuning freedom degree with a rigidity tuning by the plastic modulus of elasticity and an elastic tuning by the rubber modulus of elasticity; and
a trailing arm fastened with a wheel at an opposite side of a vehicle body fastening part formed through the bush.

15. The suspension system of claim 14,
wherein the trailing arm is coupled to end portions of left and right sides of a torsion beam to be configured as a Coupled Torsion Beam Axle (CTBA).

* * * * *